United States Patent
Arriola et al.

(10) Patent No.: US 6,624,254 B1
(45) Date of Patent: Sep. 23, 2003

(54) SILANE FUNCTIONALIZED OLEFIN INTERPOLYMER DERIVATIVES

(75) Inventors: Daniel J. Arriola, Midland, MI (US); Matthew T. Bishop, Midland, MI (US); Richard E. Campbell, Jr., Midland, MI (US); David D. Devore, Midland, MI (US); Stephen E. Hahn, Midland, MI (US); Thoi H. Ho, Lake Jackson, TX (US); Thomas J. McKeand, Freeport, TX (US); Francis J. Timmers, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 309 days.

(21) Appl. No.: 09/593,861

(22) Filed: Jun. 14, 2000

Related U.S. Application Data

(63) Continuation-in-part of application No. 09/234,831, filed on Jan. 21, 1999, now Pat. No. 6,258,902.
(60) Provisional application No. 60/146,291, filed on Jul. 29, 1999.

(51) Int. Cl.[7] .................................................. C08F 30/08
(52) U.S. Cl. ..................... 525/326.5; 525/474; 526/279
(58) Field of Search ........................ 526/279; 525/474, 525/326.5

(56) References Cited

U.S. PATENT DOCUMENTS

| | | | |
|---|---|---|---|
| 3,644,306 A | | 2/1972 | Longi et al. .............. 260/80.71 |
| 4,412,042 A | * | 10/1983 | Matsuura et al. ............ 525/260 |
| 5,085,895 A | * | 2/1992 | Asanuma et al. ......... 427/393.5 |
| 5,550,194 A | | 8/1996 | Hoxmeier et al. .......... 525/250 |
| 5,741,858 A | | 4/1998 | Brann et al. ................. 525/101 |
| 6,258,902 B1 | * | 7/2001 | Campbell et al. ............. 526/82 |

FOREIGN PATENT DOCUMENTS

| | | | |
|---|---|---|---|
| EP | 321 259 A2 | * 6/1989 | ........... C08F/30/80 |
| EP | 438710 | 7/1991 | |
| EP | 321259 | 3/1995 | |
| EP | 702032 | 4/1999 | |
| EP | 739910 | 7/1999 | |
| WO | WO 95/29197 | 11/1995 | |
| WO | WO 97/24023 | 7/1997 | |
| WO | WO 97/42234 | 11/1997 | |
| WO | WO 98/56835 | 12/1998 | |
| WO | WO 99/41289 | 8/1999 | |

OTHER PUBLICATIONS

*Journal of the American Chemical Society*, vol. 117, pp. 10747–10748, 1995.

*Journal of the American Chemical Society*, vol. 120, pp. 4019–4020, 1998.

* cited by examiner

Primary Examiner—David W. Wu
Assistant Examiner—Rip A Lee

(57) ABSTRACT

Silane functional polymers having uniform silane distribution, long chain branching or tertiary silane functionality and conversion thereof through coupling, hydrolysis, hydrolysis and neutralization, condensation, oxidation or hydrosilation are disclosed.

4 Claims, No Drawings

SILANE FUNCTIONALIZED OLEFIN INTERPOLYMER DERIVATIVES

CROSS REFERENCE STATEMENT

This application claims the benefit of U.S. Provisional Application No. 60/146,291, filed Jul. 29, 1999 and is a continuation-in-part of U.S. Ser. No. 09/234,831, filed Jan. 21, 1999, now U.S. Pat. No. 6,258,902.

BACKGROUND OF THE INVENTION

The present invention relates to olefin interpolymers having uniform incorporation of silane functionality therein and to derivatives thereof formed by post polymerization reaction of such silane functionality. The interpolymers and derivatives thereof may be usefully employed in the preparation of solid objects and articles such as moldings, films, sheets and foamed objects by molding, extruding or the like process.

In EP-A-321259, silicon containing polymers prepared by polymerizing a vinyl silane compound or copolymerizing the same with an olefin monomer using as a catalyst a titanium compound supported on a magnesium halide carrier and an organic aluminum halide compound were disclosed. In WO 97/42234, there is disclosed a process for the preparation of polymers of vinylidene aromatic monomers having a stereoregular structure of high syndiotacticity, by the use of Group 4 metal coordination catalysts and a hydrocarbylsilane or dihydrocarbylsilane adjuvant. In *Journal of the American Chemical Society* (*JACS*), (1995), 117, 10747–10748 and in EP-A-739,910, the use of silanes as chain transfer agents in metallocene-mediated olefin polymerizations was described. The products formed included silyl terminated polyolefins. Additional disclosures of interest include: U.S. Pat. No. 5,741,858; EP-A-702 032; EP-A-325 573; WO 97/24023; WO 98/56835; WO 095/29197; and *JACS* (1998), 120, 4019–4020. For the teachings contained therein, the foregoing patents, publications and equivalent United States patent applications are hereby incorporated by reference.

SUMMARY OF THE INVENTION

According to the present invention there is now provided:

A) A process for preparing silane functionalized interpolymers of one or more addition polymerizable monomers, the process comprising contacting one or more addition polymerizable monomers lacking silane functionality and one or more alkenylsilane compounds corresponding to the formula: $A_nJ_jSiH_{4-(n+j)}$ wherein:
  J is $C_{1-40}$ hydrocarbyl,
  A is a $C_{2-20}$ alkenyl group,
  n is 1 or 2, preferably 1, and
  j is 0, 1 or 2;
with a catalyst composition comprising a Group 3–10 metal complex under addition polymerization conditions, wherein the interpolymer comprises from 0.01 to 100 long chain branches per 10,000 carbons. Preferably such interpolymers comprise from 0.01 to 1000 silane groups derived from the alkenylsilane compound per 10,000 carbons. Also claimed are the resulting interpolymers containing in polymerized form one or more addition polymerizable monomers and the interpolymerized derivative of the foregoing alkenylsilane compound, including the preferred embodiments of such interpolymers.

In a further embodiment of the present invention there is provided:

B) A process for preparing silane functionalized interpolymers of one or more addition polymerizable monomers, the process comprising contacting one or more addition polymerizable monomers lacking silane functionality and one or more alkenylsilane compounds corresponding to the formula: $A_nJ_jSiH_{4-(n+j)}$ wherein:
  J is $C_{1-40}$ hydrocarbyl,
  A is a $C_{2-20}$ alkenyl group,
  n is 1 or 2, preferably 1, and
  j is 0, 1 or 2;
with a catalyst composition comprising a Group 3–10 metal complex under addition polymerization conditions, wherein the interpolymer comprises randomly distributed silane functionality within the interpolymer, preferably uniformly and randomly distributed silane functionality within the interpolymer. Preferably the interpolymer contains from 0.01 to 100 long chain branches per 10,000 carbons. More preferably, the interpolymer contains from 0.01 to 1000 silane groups derived from the alkenylsilane compound per 10,000 carbons, most preferably from 0.05 to 50 silane groups derived from the alkenylsilane compound per 10,000 carbons. Also claimed are the resulting interpolymers, including the preferred and most preferred embodiments of such interpolymers.

In yet another embodiment of the present invention there is provided:

C) A process for preparing silane functionalized interpolymers of one or more addition polymerizable monomers, the process comprising contacting one or more addition polymerizable monomers lacking silane functionality and one or more alkenylsilane compounds corresponding to the formula: $AJ_2SiH$ wherein:
  J is $C_{1-40}$ hydrocarbyl, and
  A is a $C_{2-20}$ alkenyl group,
with a catalyst composition comprising a Group 3–10 metal complex under addition polymerization conditions, wherein the interpolymer comprises silane functionality derived from the alkenylsilane compound within the interpolymer, preferably randomly distributed silane functionality within the interpolymer, and most preferably uniformly and randomly distributed silane functionality within the interpolymer. Preferably the interpolymer contains from 0.01 to 100 long chain branches per 10,000 carbons. Also preferably, the interpolymer contains from 0.01 to 1000 silane groups derived from the alkenylsilane compound per 10,000 carbons, more preferably from 0.05 to 50 silane groups derived from the alkenylsilane compound per 10,000 carbons. Also claimed are the resulting interpolymers, including the preferred and most preferred embodiments of such interpolymers.

Finally, according to the present invention there are provided a process for preparing further derivatives of interpolymers of an addition polymerizable monomer and an alkenylsilane compound corresponding to the formula: $A_nJ_jSiH_{4-(n+j)}$ wherein:
  J is $C_{1-40}$ hydrocarbyl,
  A is a $C_{2-20}$ alkenyl group,
  n is 1 or 2, preferably 1, and
  j is 0, 1 or 2;
said derivative being formed by one or more subsequent silane conversion processes. Also claimed are the resulting derivatives of silane functional interpolymers resulting from such one or more silane conversion processes.

DETAILED DESCRIPTION OF THE INVENTION

All reference to the Periodic Table of the Elements herein shall refer to the Periodic Table of the Elements, published and copyrighted by CRC Press, Inc., 1995. Also, any reference to a Group or Series shall be to the Group or Series as reflected in this Periodic Table of the Elements, utilizing the IUPAC system for numbering groups. Where any reference is made herein to any publication, patent application or provisional patent application, the contents thereof are incorporated herein in its entirety by reference. By the term "interpolymer" herein is meant any form of polymer, including graft or block polymers, that includes in polymerized form two or more monomers. By the term "random distribution" as used herein, is meant that the silane functionality resulting from polymerization of the alkenylsilane group is distributed within each polymer chain in a random or nearly random, e.g., non-block, manner (intrachain distribution). By the term "uniform distribution" is meant that the forgoing silane functionality is equally or nearly equally distributed among different polymer chains (interchain distribution). When subsequent derivatives of the silane groups of such random or of such uniform, random interpolymers are performed, for example coupling, the resulting converted polymer's physical properties are improved and are more homogeneous because none of the polymer populations are systematically included or excluded from the reaction. Advantageously therefor, highly efficient post reactor functionalization of the present interpolymers may be obtained.

Quantification of silane content in the interpolymers of the invention may be achieved by the use of any suitable analytical technique, including $^{13}$C NMR-, $^{29}$Si NMR- and IR-spectroscopic analysis of the interpolymer. Such techniques may also be employed to monitor and measure the degree of conversion of silane functionality in subsequent derivative formation.

Interchain distribution of silane within the interpolymers may be measured by a polymer fractionation technique, followed by silane analysis of the various polymer fractions, using one of the foregoing techniques. Examples of suitable fractionation techniques include Temperature Rising Elution Fractionation (TREF), Analytical Temperature Rising Elution Fractionation (ATREF) or high pressure liquid chromatography (HPLC).

TREF analysis is a well known method of fractionation that has been published in the open literature over the past 15 years. ATREF is a similar technique for fractional analysis of olefin polymers capable of fractionating semi-crystalline polymers as a function of crystallization temperature while simultaneously estimating the molecular weight of the fractions. It has been described in U.S. Pat. No. 4,798,081, as well as in "Determination of Short-Chain Branching Distributions of Ethylene copolymers by Automated Analytical Temperature Rising Elution Fractionation" (Auto-ATREF), *J. of Appl Pol Sci*: Applied Polymer Symposium 45, 25–37 (1990). The primary difference between ATREF and TREF is that the ATREF technique is done on a small scale and fractions are not actually isolated. Instead, a typical liquid chromatographic (LC) mass detector, such as an infrared single frequency detector, is used to quantify the crystallinity distribution of a polymer as a function of elution temperature. This distribution can then be transformed to any number of alternative domains such as comonomer distribution. This transformed distribution can then be interpreted according to a structural variable like comonomer content.

To obtain ATREF data, a commercially available viscometer especially adapted for LC analysis, such as a Viskotek™ is coupled with the IR mass detector. Together these two LC detectors can be used to calculate the intrinsic viscosity of the ATREF eluant. The viscosity average molecular weight of a given fraction can then be estimated using appropriate Mark Houwink constants, the corresponding intrinsic viscosity, and suitable coefficients to estimate the fractions concentration (dl/g) as it passes through the detectors. Thus, a typical ATREF report will provide the weight fraction polymer and viscosity average molecular weight as a function of elution temperature.

The molecular weight partitioning factor, $M_{pf}$, characterizes the ratio of the average molecular weight of the fractions with high comonomer content to the average molecular weight of the fractions with low comonomer content. Higher and lower comonomer content are defined as being below or above the median elution temperature of the TREF concentration plot respectively. That is, the TREF data is divided into two parts of equal weight. $M_{pf}$ is calculated from the following equation:

$$M_{pf} = \frac{\frac{\sum_{i=1}^{n} w_i \cdot M_i}{\sum_{i=1}^{n} w_i}}{\frac{\sum_{j=1}^{m} w_j \cdot M_j}{\sum_{j=1}^{m} w_j}},$$

where: $M_i$ is the viscosity average molecular weight and $w_i$ is the normalized weight fraction as determined by ATREF for the n data points in the fractions below the median elution temperature. $M_j$ is the viscosity average molecular weight and $w_j$ is the normalized weight fraction as determined by ATREF for the m data points in the fractions above the median elution temperature. Only those weight fractions, $w_i$ or $w_j$, which have associated viscosity average molecular weights greater than zero are used to calculate $M_{pf}$. For a valid calculation, it is required that n and m are greater than or equal to 3.

Randomness, or the distribution of silane functionality within a chain, can be calculated based on the various reactivity ratios for the catalyst with respect to the various comonomers. For a terpolymerization, as a most useful example, the reactivity ratios, r, for each monomer may be calculated based on two indices, i and j, where $k_{ij}$ is the rate constant for the most recently incorporated monomer i, with incoming monomer i or j during catalysis, with the reactivity ratio defined according to the formula: $r_{ij}=k_{ii}/k_{ij}$. Thus, for three monomers, identified as 1, 2, and 3, respectively, $r_{12}=k_{11}/k_{12}$, $r_{21}=k_{22}/k_{21}$, $r_{13}=k_{11}/k_{13}$, and $r_{31}=k_{33}/k_{31}$. A random distribution of monomers throughout the copolymer chain is achieved, when $r_{12}*r_{21}=1$ or nearly one and $r_{13}*r_{31}=1$ or nearly one. For such terpolymers wherein two of the comonomers have similar reactivity ratios (e.g., hexenyldimethylsilane and octene), the further simplification $r_{12} \equiv r_{13}$ and $r_{21} \equiv r_{31}$ may be made as well.

Preferred interpolymers of the invention are those wherein the silane randomness meets the requirement of: $0.1 \leq r_{12}*r_{21} \leq 10.0$, more preferably $0.5 \leq r_{12}*r_{21} \leq 2$, most preferably $0.75 \leq r_{12}*r_{21} \leq 1.5$. Highly preferably, all comonomers are uniformly and randomly distributed within the polymer chains, or are nearly uniformly and randomly so distributed.

For a highly uniform polymer, the intrachain distribution or randomness can also be determined using $^{13}C$ NMR spectroscopy, according to known techniques.

As used herein the term "long chain branching" refers to pendant oligomeric, hydrocarbyl-, hydrocarbylsilyl- or silylhydrocarbyl-groups attached to a polymeric chain, which groups have a length greater than the length of a short chain group resulting from addition of a lone, intentionally added, polymerizable comonomer into the polymer chain. Examples of such intentionally added comonomers include propene, 1-butene, 1-hexene, 1-octene, branched olefins, and alkenylsilanes. Long chain branching in the present context includes polymer branches resulting from the reincorporation of addition polymerizable compounds generated as a result of β-hydride elimination, or other vinyl group generating process, with or without the involvement of the silane. Such long chain branches furthermore preferably reflect the monomer diversity present in the polymerization reactor, since in effect, they are portions of preformed polymer which are reincorporated into a growing polymer chain. In addition, long chain, silane functional branches can arise through chain transfer to the alkenylsilane compound, thereby generating a second, usually terminal, vinyl group in such compound, which vinyl group subsequently enters into the polymerization; reaction of the silane functionality of the alkenylsilane compound rather than the alkenyl functionality with the growing polymer chain, followed by addition polymerization of the alkenyl group; or chain transfer to a previously formed silane functional interpolymer.

Several techniques for measuring the extent of long chain branching in a copolymer already exist. Principle analytical techniques include those based on $^{13}C$ NMR analysis, optionally coupled with low angle laser light scattering or similar particle size measuring technique. Additionally, it is possible to arrive at an estimate of short chain branches, i.e., branches due to the $C_{3-8}$ comonomer remnant, by preparation of a control copolymer using a labeled monomer, such as $^{13}C$ enriched 1-octene or ethylene, under the assumption that a similar level of branch distribution will exist in copolymers made under comparative conditions utilizing unmodified monomers. The level of long chain branching is thereafter determined by subtraction. The level of long chain branching may additionally be quantified from a knowledge of the silane branching centers present in the resulting copolymer, determined, for example, by $^{13}C$ or $^{29}Si$ NMR analysis, in addition to any conventional long chain branching that may arise due to the foregoing continuous high conversion process technique. Preferred polymers according to the present invention contain from 0.3 to 10 long chain branches per 10,000 carbons.

The incidence of long chain branching can be increased by careful control of processing conditions. For example, the use of a continuous, solution polymerization process (in which reactants and catalyst are continuously added to a polymerization reactor and product is continuously removed therefrom) operating at high conversion conditions favors long chain branch incorporation due to a relative increased molar concentration of in situ generated long chain, vinyl terminated monomer. Additionally, process conditions resulting in high local concentrations of β-hydride elimination products, for example gas phase polymerization processes, also favor long chain branch formation.

Preferred alkenylsilane compounds used herein include hexenylsilane, allylsilane, vinylsilane, octenylsilane, hexenyldimethylsilane, octenyldimethylsilane, vinyldimethylsilane, vinyldiethylsilane, vinyldi(n-butyl) silane, vinylmethyloctadecylsilane, vinyidiphenylsilane, vinyldibenzylsilane, allyldimethylsilane, allyldiethylsilane, allyldi(n-butyl)silane, allylmethyloctadecylsilane, allyldiphenylsilane, bishexenylsilane, and allyidibenzylsilane. Mixtures of the foregoing alkenylsilanes may also be used.

Preferred addition polymerizable monomers are olefins or mixtures of olefins and diolefins. Most preferred olefins are the $C_{2-20}$ α-olefins and mixtures thereof, most preferably, ethylene, propylene, and mixtures of ethylene with propylene, 1-butene, 1-hexene or 1-octene. The most preferred quantity of silane functionality in the interpolymers is from 0.05 to 50 such groups per 10,000 carbons.

Suitable catalysts for use herein preferably include a complex of a metal of Groups 3–10 of the Periodic Table of the Elements capable of polymerizing or being activated to polymerize the foregoing addition polymerizable compounds, especially olefins. Examples include Group 10 diimine derivatives corresponding to the formula:

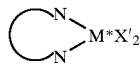

Wherein,
M* is Ni(II) or Pd(II);
X' is halo, hydrocarbyl, or hydrocarbyloxy;
Ar* is an aryl group, especially 2,6-diisopropylphenyl or aniline group; and
the two nitrogen atoms are linked by a divalent bridging group of up to 60 atoms other than hydrogen, in particular, a 1,2-ethanediyl, 2,3-butanediyl, dimethylenesilane group, or a fused ring system, such as 1,8-naphthanediyl.

The foregoing complexes are disclosed by M. Brookhart, et al., in *J. Am. Chem. Soc.*, 118, 267–268 (1996), *J. Am. Chem. Soc.*, 117, 6414–6415 (1995), and J. Feldman et al., *Organometallics* (1997), 16, 1514–1516, as being active polymerization catalysts especially for polymerization of β-olefins, either alone or in combination with polar comonomers such as vinyl chloride, alkyl acrylates and alkyl methacrylates.

Additional complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, phosphoryl groups and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethyl-silyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e.g. amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing analogues to benzene. They are previously known in the art having been described by G. Herberich, et al., in *Organometallics,* 14,1, 471–480 (1995). Preferred boratabenzenes correspond to the formula:

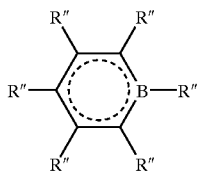

wherein R" is selected from the group consisting of hydrocarbyl, silyl, N,N-dialkylamino, N,N-diarylamino, or germyl, said R" having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

A suitable class of catalysts are transition metal complexes corresponding to the formula:

$$K'_k MZ'_m L_l X_p, \text{ or a dimer thereof}$$

wherein:

K' is an anionic group containing delocalized π-electrons through which K' is bound to M, said K' group containing up to 50 atoms not counting hydrogen atoms, optionally two K' groups may be joined together forming a bridged structure, and further optionally one K' may be bound to Z';

M is a metal of Group 4 of the Periodic Table of the Elements in the +2, +3 or +4 formal oxidation state;

Z' is an optional, divalent substituent of up to 50 non-hydrogen atoms that together with K' forms a metallocycle with M;

L is an optional neutral ligand having up to 20 non-hydrogen atoms;

X each occurrence is a monovalent, anionic moiety having up to 40 non-hydrogen atoms, optionally, two X groups may be covalently bound together forming a divalent dianionic moiety having both valences bound to M, or, optionally 2 X groups may be covalently bound together to form a neutral, conjugated or non-conjugated diene that is bound to M by means of delocalized π-electrons, (whereupon M is in the +2 oxidation state), or further optionally one or more X and one or more L groups may be bonded together thereby forming a moiety that is both covalently bound to M and coordinated thereto by means of Lewis base functionality;

k is 0, 1 or 2; m is 0 or 1; l is a number from 0 to 3; p is an integer from 0 to 3; and the sum, k+m+p, is equal to the formal oxidation state of M, except when 2 X groups together form a neutral conjugated or non-conjugated diene that is bound to M via delocalized π-electrons, in which case the sum k+m is equal to the formal oxidation state of M.

Preferred complexes include those containing either one or two K' groups. The latter complexes include those containing a bridging group linking the two groups. Preferred bridging groups are those corresponding to the formula $(ER'_2)_x$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and x is 1 to 8. Preferably, R' independently each occurrence is methyl, ethyl, propyl, benzyl, tert-butyl, phenyl, methoxy, ethoxy or phenoxy.

Examples of the complexes containing two K' groups are compounds corresponding to the formula:

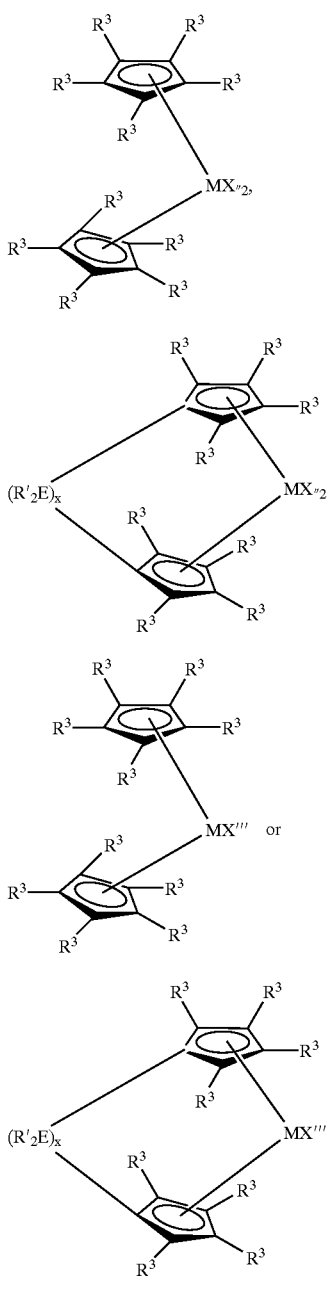

wherein:

M is titanium, zirconium or hafnium, preferably zirconium or hafnium, in the +2, +3, or +4 formal oxidation state;

$R^3$ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said $R^3$ having up to 20 non-hydrogen atoms, or adjacent $R^3$ groups together form a divalent derivative thereby forming a fused ring system, and X″ independently each occurrence is an anionic ligand group of up to 40 non-hydrogen atoms, or two X″ groups together form a divalent anionic ligand group of up to 40 non-hydrogen atoms, X‴ independently each occurrence is a stabilizing anionic ligand group selected from 2-(N,N-dimethylaminobenzyl), m-(N,N-dimethylaminomethyl)phenyl, allyl, and $C_{1-10}$ hydrocarbyl substituted allyl, whereupon M is in the +3 formal oxidation state, or X‴ independently each occurrence is a neutral, conjugated diene, or a silyl, germyl, or halohydrocarbyl substituted derivative thereof, having up to 40 atoms other than hydrogen, whereupon M is in the +2 formal oxidation state, E is silicon, germanium, tin, or carbon, R′ independently each occurrence is hydrogen or a group selected from silyl, hydrocarbyl, hydrocarbyloxy and combinations thereof, said R′ having up to 30 carbon or silicon atoms, and x is 1 to 8.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded ligand groups, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Additional examples of suitable metal complexes are compounds corresponding to the following formulas:

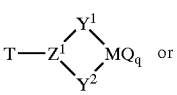 Formula 1

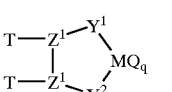 Formula 2 wherein:

M is titanium, zirconium, or hafnium in the +4, +3, or +2 oxidation state;

$Y^1$ and $y^2$ are independently an anionic, cyclic or non-cyclic, π-bonded group; $NR^1$, or $PR^1$; or $Y^1$ and $y^2$ are neutral $NR^1_2$ or $PR^1_2$ groups;

$Z^1$ is boron or aluminum;

Q is a neutral, anionic or dianionic ligand group depending on the oxidation state of M;

q is 1, 2 or 3 depending on the oxidation state of M and the electronic nature of Q;

T independently each occurrence is:

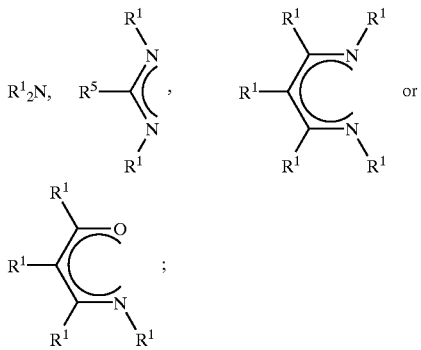

R¹ is independently each occurrence hydrogen, a hydrocarbyl group, a tri(hydrocarbyl)silyl group, or a tri(hydrocarbyl)silylhydrocarbyl group, said R¹ groups containing up to 20 atoms not counting hydrogen;

R⁵ is R¹ or N(R¹)₂; and two R¹ groups together or one or more R¹ groups together with R⁵ may optionally be joined to form a ring structure.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl) silane, dimethyl(cyclopentadienyl)(fluoren-1-yl)silane, dimethyl(cyclopentadienyl)(octahydrofluoren-1-yl)silane, dimethyl(cyclopentadienyl)(tetrahydro-fluoren-1-yl)silane, (1,1,2,2-tetramethy)-1,2-bis(cyclopentadienyl)disilane, (1,2-bis(cyclopentadienyl)ethane, and dimethyl (cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative. Most preferred X" groups are $C_{1-20}$ hydrocarbyl groups.

Preferred X" groups are 1,3-pentadiene, and 1,4-diphenylbutadiene.

A further class of metal complexes utilized in the present invention corresponds to the preceding formula $K'_kMZ'_mL_nX_p$, or a dimer thereof, wherein Z' is a divalent substituent of up to 50 non-hydrogen atoms that together with K' forms a metallocycle with M.

Preferred divalent Z' substituents include groups containing up to 30 non-hydrogen atoms comprising at least one atom that is oxygen, sulfur, boron or a member of Group 14 of the Periodic Table of the Elements directly attached to K', and a different atom, selected from the group consisting of nitrogen, phosphorus, oxygen or sulfur that is covalently bonded to M.

A preferred class of such Group 4 metal coordination complexes used according to the present invention corresponds to the formula:

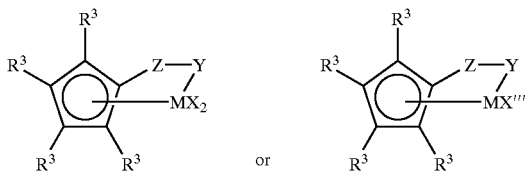

wherein:

M is titanium or zirconium;

R³ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said R³ having up to 20 non-hydrogen atoms, or adjacent R³ groups together form a divalent derivative thereby forming a fused ring system, each X is a halo, hydrocarbyl, hydrocarbyloxy or silyl group, said group having up to 20 non-hydrogen atoms, or two X groups together form a divalent derivative thereof;

X'" is a neutral, conjugated diene, or a silyl, germyl, or halohydrocarbyl substituted derivative thereof, having up to 40 atoms other than hydrogen, whereupon M is in the +2 formal oxidation state, Y is —O—, —S—, —NR'—, or —PR'—, and Z is SiR'₂, CR'₂, SiR'₂SiR'₂, CR'₂CR'₂, CR'=CR', CR'₂SiR'₂, or GeR'₂, wherein R' independently each occurrence is hydrogen or a group selected from silyl, hydrocarbyl, hydrocarbyloxy and combinations thereof, said R' having up to 30 carbon or silicon atoms.

Additional suitable complexes correspond to the formula:

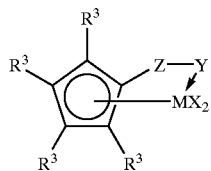

wherein:

M is titanium or zirconium, preferably titanium in the +3 formal oxidation state;

R³ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said R³ having up to 20 non-hydrogen atoms, or adjacent R³ groups together form a divalent derivative thereby forming a fused ring system, each X is a halo, hydrocarbyl, hydrocarbyloxy or silyl group, said group having up to 20 non-hydrogen atoms, or two X groups together form a divalent derivative thereof;

E is silicon, germanium, tin, or carbon,

R' independently each occurrence is hydrogen or a group selected from silyl, hydrocarbyl, hydrocarbyloxy and combinations thereof, said R' having up to 30 carbon or silicon atoms, x is 1 to 8, Y is —OR, or —NR$_2$; and Z is SiR'$_2$, CR'$_2$, SiR'$_2$SiR'$_2$, CR'$_2$CR'$_2$, CR'=CR', CR'$_2$SiR'$_2$, or GeR'$_2$, wherein R' is as previously defined.

Additional suitable complexes correspond to the formula:

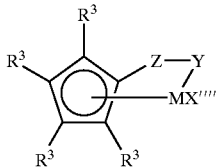

wherein:

M is titanium or zirconium, preferably titanium in the +3 formal oxidation state;

R$^3$ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said R$^3$ having up to 20 non-hydrogen atoms, or adjacent R$^3$ groups together form a divalent derivative thereby forming a fused ring system, X"" is 2-(N,N-dimethylaminobenzyl), m-(N,N-dimethylaminomethyl)phenyl, allyl, and C$_{1-10}$ hydrocarbyl substituted allyl;

Y is —O—, —S—, —NR'—, or —PR'—, and

Z is SiR'$_2$, CR'$_2$, SiR'$_2$SiR'$_2$, CR'$_2$CR'$_2$, CR'=CR', CR'$_2$SiR'$_2$, or GeR'$_2$, wherein R' is as previously defined.

Illustrative Group 4 metal complexes that may be employed in the practice of the present invention include:

biscyclopentadienyl complexes such as
bis(cyclopentadienyl)zirconium dichloride,
bis(cyclopentadienyl)zirconium dimethyl,
bis(t-butylcyclopentadienyl)zirconium dichloride,
bis(t-butylcyclopentadienyl)zirconium dimethyl,
(fluorenyl)(cyclopentadienyl)zirconium dichloride,
(fluorenyl)(cyclopentadienyl)zirconium dimethyl,
bis(indenyl)zirconium dichloride,
bis(indenyl)zirconium dimethyl,
rac-dimethylsilane-bis(cyclopentadienyl)zirconium dichloride,
rac-dimethylsilane-bis(cyclopentadienyl)zirconium dimethyl,
rac-dimethylsilane-bis(tetramethylcyclopentadienyl)zirconium dichloride,
rac-dimethylsilane-bis(tetramethylcyclopentadienyl)zirconium dimethyl,
rac-dimethylsilane-bis{1-(2-methyl-4-phenylindenyl)}zirconium dichloride,
rac-dimethylsilane-bis{1-(2-methyl-4-(α-naphthyl)indenyl)}zirconium dichloride,
rac-dimethylsilane-bis{1-(2-methyl-4-(β-naphthyl)indenyl}zirconium dichloride,
rac-1,2-ethylene-bis{1-(2-methyl-4-phenylindenyl)}zirconium dichloride,
rac-1,2-ethylene-bis{1-(2-methyl-4-(α-naphthyl)indenyl)}zirconium dichloride,
rac-dimethylsilane-bis(cyclopentadienyl)zirconium(II) 1,4-diphenyl-1,3-butadiene,
rac-dimethylsilane-bis(cyclopentadienyl)zirconium(II) 2,4-hexadiene,
rac-dimethylsilane-bis{1-(2-methyl-4-phenylindenyl)}zirconium(II) 1,3-pentadiene,
rac-dimethylsilane-bis{1-(2-methyl-4-(α-naphthyl)indenyl)}zirconium(II) 1,3-pentadiene,
rac-1,2-ethylene-bis{1-(2-methyl-4-phenylindenyl)}zirconium(II) 1,3-pentadiene,
rac-1,2-ethylene-bis{1-(2-methyl-4-(α-naphthyl)indenyl)}zirconium(II) 1,3-pentadiene,
rac-1,2-ethylene-bis{1-(2-methyl-4-(β-naphthyl)indenyl}zirconium(II) 1,3-pentadiene,
rac-1,2-ethylene-bis{1-(2-methyl-4-(1-anthracenyl)indenyl)}zirconium(II) 1,3-pentadiene,
rac-1,2-ethylene-bis{1-(2-methyl-4-(2-anthracenyl)indenyl)}zirconium(II) 1,3-pentadiene,
rac-1,2-ethylene-bis{1-(2-methyl-4-(9-anthracenyl)indenyl)}zirconium(II) 1,3-pentadiene,
rac-1,2-ethylene-bis{1-(2-methyl-4-(9-phenanthryl)indenyl)}zirconium(II) 1,3-pentadiene,
rac-1,2-ethylene-bis{1-(2-methyl-4-phenylindenyl)}zirconium(II) 1,4-diphenyl-1,3-butadiene,
rac-1,2-ethylene-bis{1-(2-methyl-4-(α-naphthyl)indenyl)}zirconium(II) 1,4-diphenyl-1,3-butadie ne, and
rac-1,2-ethylene-bis{1-(2-methyl-4-(β-naphthyl)indenyl}zirconium(II) 1,4-diphenyl-1,3-butadien e.

Examples of metal complexes containing a single cyclic ligand containing delocalized π-electrons and a bridging structure to the metal (known as constrained geometry complexes) used in the present invention wherein the metal is in the +4 formal oxidation state include the following complexes:

(tert-butylamido)(tetramethylcyclopentadienyl)dimethylsilanetitanium dichloride,
(cyclohexylamido)(tetramethylcyclopentadienyl)dimethylsilanetitanium dichloride,
(cyclododecylamido)(tetramethylcyclopentadienyl)dimethylsilanetitanium dichloride,
(tert-butylamido)(2-methyl-4-phenylinden-1-yl)dimethylsilanetitanium dichloride,
(tert-butylamido)(3-pyrrolylinden-1-yl)dimethylsilanetitanium dichloride,
(cyclohexylamido)(3-pyrrolylinden-1-yl)dimethylsilanetitanium dichloride,
(tert-butylamido)(η$^5$-3-phenyl-s-indacen-1-yl)dimethylsilanetitanium dichloride,
(tert-butylamido)(η$^5$-2-methyl-3-biphenyl-s-indacen-1-yl)dimethylsilanetitanium dichloride,
(tert-butylamido)(η$^5$-3-phenyl-gem-dimethylacenaphthalen-1yl)dimethylsilanetitanium dichloride,
(tert-butylamido)(tetramethylcyclopentadienyl)dimethylsilanetitanium dimethyl,
(cyclohexylamido)(tetramethylcyclopentadienyl)dimethylsilanetitanium dimethyl,
(cyclododecylamido)(tetramethylcyclopentadienyl)dimethylsilanetitanium dimethyl,
(tert-butylamido)(2-methyl-4-phenylinden-1-yl)dimethylsilanetitanium dimethyl, (tert-butylamido)(3-pyrrolylinden-1-yl)
dimethylsilanetitanium dimethyl,
(cyclohexylamido)(3-pyrrolylinden-1-yl)
dimethylsilanetitanium dimethyl,
(tert-butylamido)($\eta^5$-3-phenyl-s-indacen-1-yl)
dimethylsilanetitanium dimethyl,
(tert-butylamido)($\eta^5$-2-methyl-3-biphenyl-s-indacen-1-yl)
dimethylsilanetitanium dimethyl,
(tert-butylamido)($\eta^5$-3-phenyl-gem-
dimethylacenaphthalen-1yl)dimethylsilanetitanium
dimethyl,
(tert-butylamido)(tetramethylcyclopentadienyl)
dimethylsilanetitanium 1,4-diphenyl-1,3-butadiene,
(cyclohexylamido)(tetramethylcyclopentadienyl)
dimethylsilanetitanium 1,4-diphenyl-1,3-butadiene,
(cyclododecylamido)(tetramethylcyclopentadienyl)
dimethylsilanetitanium 1,4-diphenyl-1,3-butadiene,
(tert-butylamido)(2-methyl-4-phenylinden-1-yl)
dimethylsilanetitanium 1,4-diphenyl-1,3-butadiene,
(tert-butylamido)(3-pyrrolylinden-1-yl)
dimethylsilanetitanium 1,4-diphenyl-1,3-butadiene,
(cyclohexylamido)(3-pyrrolylinden-1-yl)
dimethylsilanetitanium 1,4-diphenyl-1,3-butadiene,
(tert-butylamido)($\eta^5$-3-phenyl-s-indacen-1-yl)
dimethylsilanetitanium 1,4-diphenyl-1,3-butadiene, (tert-
butylamido)($\eta^5$-2-methyl-3-biphenyl-s-indacen-1-yl)
dimethylsilanetitanium 1,4-diphenyl-1,3-butadiene,
(tert-butylamido)($\eta^5$-3-phenyl-gem-
dimethylacenaphthalen-1yl)dimethylsilanetitanium 1,4-
diphenyl-1,3-butadiene,
(tert-butylamido)(tetramethylcyclopentadienyl)
dimethylsilanetitanium 1,3-pentadiene,
(cyclohexylamido)(tetramethylcyclopentadienyl)
dimethylsilanetitanium 1,3-pentadiene,
(cyclododecylamido)(tetramethylcyclopentadienyl)
dimethylsilanetitanium 1,3-pentadiene,
(tert-butylamido)(2-methyl-4-phenylinden-1-yl)
dimethylsilanetitanium 1,3-pentadiene,
(tert-butylamido)(3-pyrrolylinden-1-yl)
dimethylsilanetitanium 1,3-pentadiene,
(cyclohexylamido)(3-pyrrolylinden-1-yl)
dimethylsilanetitanium 1,3-pentadiene,
(tert-butylamido)($\eta^5$-3-phenyl-s-indacen-1-yl)
dimethylsilanetitanium 1,3-pentadiene, and
(tert-butylamido)($\eta^5$-2-methyl-3-biphenyl-s-indacen-1-yl)
dimethylsilanetitanium 1,3-pentadiene.

Other complexes, especially those containing other Group 4 metals, will, of course, be apparent to those skilled in the art.

The preferred Group 4 metal complexes are rendered catalytically active by combination with an activating cocatalyst or by use of an activating technique. Suitable activating cocatalysts for use herein include polymeric or oligomeric alumoxanes, especially methylalumoxane, triisobutyl aluminum modified methylalumoxane, diisobutylalumoxane or perfluoroaryl modified alumoxane; strong Lewis acids, such as $C_{1-30}$ hydrocarbyl substituted Group 13 compounds, especially tri(hydrocarbyl)aluminum- or tri(hydrocarbyl)boron-compounds and halogenated derivatives thereof, having from 1 to 10 carbons in each hydrocarbyl or halogenated hydrocarbyl group, especially tris(pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003, U.S. Pat. Nos. 5,153,157, 5,064,802, EP-A-468,651, EP-A-520,732, and WO93/23412.

Suitably, polymeric or oligomeric alumoxanes, when used, are present in a molar amount compared to metal complex from 10:1 to 1000:1, preferably from 50:1 to 200:1. Aluminoxanes, or alkylaluminoxanes, are generally believed to be oligomeric or polymeric alkylaluminoxy compounds, including cyclic oligomers. Generally such compounds contain, on average about 1.5 alkyl groups per aluminum atom, and are prepared by reaction of trialkylaluminum compounds or mixtures of compounds with water. Perfluoroaryl substituted alumoxanes are readily prepared by combining an alkylalumoxane, which may also contain residual quantities of trialkylaluminum compound, with a fluoroaryl ligand source, preferably a strong Lewis acid containing fluoroaryl ligands, followed by removing byproducts formed by the ligand exchange. Preferred fluoroaryl ligand sources are trifluoroarylboron compounds, most preferably tris(pentafluorophenyl)boron, which result in trialkylboron ligand exchange products, that are relatively volatile and easily removable from the reaction mixture.

The reaction may be performed in any aliphatic, alicyclic or aromatic liquid diluent or mixture thereof. Preferred are $C_{6-8}$ aliphatic and alicyclic hydrocarbons and mixtures thereof, including hexane, heptane, cyclohexane, and mixed fractions such as Isopar™ E, available from Exxon Chemicals Inc. After contacting of the alkylalumoxane and source of fluoroaryl ligand the reaction mixture may be purified to remove ligand exchange products, especially any trialkylboron compounds by any suitable technique. Alternatively, the Group 3–10 metal complex catalyst may first be combined with the reaction mixture prior to removing the residual ligand exchange products.

Suitable techniques for removing alkyl exchange byproducts from the reaction mixture include degassing optionally at reduced pressures, distillation, solvent exchange, solvent extraction, extraction with a volatile agent, contacting with a zeolite or molecular sieve, and combinations of the foregoing techniques, all of which are conducted according to conventional procedures. Purity of the resulting product may be determined by $^{11}$B NMR of the resulting product. Preferably the quantity of residual alkyl exchange product is less than 10 weight percent, based on solids content, preferably less than 1.0 weight percent, most preferably less than 0.1 weight percent.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, A⁻. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

$$(L^*\text{---}H)^+_d A^{d-}$$

wherein:
L* is a neutral Lewis base;
(L*-H)$^+$ is a Bronsted acid;
$A^{d-}$ is a noncoordinating, compatible anion having a charge of d–, and
d is an integer from 1 to 3.
More preferably d is one, that is, $A^{d-}$ 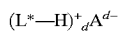.
Highly preferably, $A^-$ corresponds to the formula: $[BQ_4]^-$
wherein:
B is boron in the +3 formal oxidation state; and
Q independently each occurrence is selected from hydride, dialkylamido, halide, alkoxide, aryloxide, hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl)borate,
methyldioctadecylammonium tetrakis(pentafluorophenyl)borate,
triethylammonium tetrakispentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis(pentafluorophenyl)borate,
trimethylammonium tetrakis(2,3,4,6-tetrafluorophenylborate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-dimethylanilinium tetrakis(2,3,4,6-tetrafluorophenyl)borate,
N,N-diethylanilinium tetrakis(2,3,4,6-tetrafluorophenyl)borate, and
N,N-dimethyl-(2,4,6-trimethylanilinium) tetrakis-(2,3,4,6-tetrafluorophenyl)borate.

Dialkyl ammonium salts such as:

dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:

triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are tetrakis(pentafluorophenyl)borate salts of long chain alkyl trisubstituted ammonium complexes, especially trialkylammonium complexes containing 1 or 2 $C_{14}$–$C_{20}$ alkyl groups, more especially methyldi(octadecyl)ammonium tetrakis(pentafluorophenyl)borate and methyldi(tetradecyl)-ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

Another suitable ion forming, activating cocatalyst comprises a salt of a cationic oxidizing agent and a noncoordinating, compatible anion represented by the formula: $(Ox^{e+})_d(A^{d-})_e$, wherein:
$Ox^{e+}$ is a cationic oxidizing agent having charge e+;
e is an integer from 1 to 3; and
$A^{d-}$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silylium ion and a noncoordinating, compatible anion represented by the formula:

$^+A^-$ wherein:
©$^+$ is a $C_{1-30}$ carbenium ion or silylium ion; and
$A^-$ is as previously defined.

A preferred carbenium ion is the trityl cation, that is triphenylcarbenium. A preferred silylium ion is triphenylsilylium.

The activating technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0 to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), DME, and mixtures thereof.

The electrolysis may be conducted in a standard electrolytic cell containing an anode and cathode (also referred to as the working electrode and counter electrode respectively). Suitably materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally, an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula: $G^+A^-$; wherein:

$G^+$ is a cation which is nonreactive towards the starting and resulting complex, and $A^-$ is a noncoordinating, compatible anion.

Examples of cations, $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl group, especially tetra-n-butylammonium tetrakis(pentafluorophenyl) borate.

In general, the active catalyst can be prepared by combining the metal complex and activator in a suitable solvent at a temperature within the range from $-100°$ C. to 300° C. The silane or hydrocarbylsilane adjuvant may be added separately or simultaneously with the remaining components. The catalyst composition may be separately prepared prior to addition of the monomers to be polymerized or prepared in situ by combination of the various components in the presence of the monomers to be polymerized. The catalysts' components are sensitive to both moisture and oxygen and should be handled and transferred in an inert atmosphere.

Preferred monomers for use herein include olefins having from 2 to 20,000, preferably from 2 to 20, more preferably from 2 to 8 carbon atoms and combinations of two or more of such olefins. Particularly suitable olefins include: ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the olefins are ethylene, propene, 1-butene, 4-methyl-1-pentene, 1-hexene, 1-octene, styrene, halo- or alkyl substituted styrenes, and tetrafluoroethylene. Other suitable monomers include vinylcyclobutene, and dienes, such as 1,4-hexadiene, dicyclopentadiene, ethylidene norbornene, and 1,7-octadiene. Mixtures of the above-mentioned monomers may also be employed.

Suitable solvents or diluents for the catalyst preparation include any of the solvents known in the prior art including, but not necessarily limited to, straight and branched-chain hydrocarbons such as $C_{6-12}$ alkanes (pentane, hexane, heptane, octane and mixtures thereof); $C_{6-12}$ cyclic and alicyclic hydrocarbons such as cyclohexane, cycloheptane, methylcyclohexane, methylcycloheptane and mixtures thereof and $C_{6-12}$ aromatic and alkyl-substituted aromatic compounds such as benzene, toluene, xylene, decalin, and mixtures thereof, as well as mixtures of the foregoing compounds.

The polymerization may be conducted under slurry, solution, bulk, gas phase or suspension polymerization conditions or other suitable reaction conditions. The polymerization can be conducted at temperatures of from 0° C. to 160° C., preferably from 25° C. to 100° C. for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as superatmospheric pressure, suitably at a pressure within the range of 1 to 500 psig (6.9 kPa–3,400 kPa). The use of ambient or low pressures, for example, 1–5 psig (6.9–34.5 kPa) is preferred in view of lower capital and equipment costs.

The polymerization may be conducted in the presence of an inert diluent or solvent or in the absence thereof, that is, in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E™, available from Exxon Chemical Company. Suitable amounts of solvent are employed to provide a monomer concentration from 5 percent to 100 percent by weight.

The molar ratio of addition polymerizable monomer (including alkenylsilane) to catalyst (in terms of the Group 3–10 metal content) may range from 100:1 to $1\times10^{10}$:1, preferably from 1000:1 to $1\times10^{6}$:1. Typically in the preparation of ethylene/olefin copolymers the molar ratio of comonomer to monomer(s) used in the polymerization depends upon the desired density for the composition being produced and is about 0.5 or less. Desirably, when producing materials with a density range of from about 0.91 to about 0.93 the comonomer to monomer ratio is less than 0.2, preferably less than 0.05, even more preferably less than 0.02, and may even be less than 0.01. Typically, the molar ratio of hydrogen to monomer in the process is less than about 0.5, preferably less than 0.2, more preferably less than 0.05, even more preferably less than 0.02, due to the presence of silane branching agent, which performs many of the functions of hydrogen with respect to molecular weight control. The molar ratio of silane or hydrocarbylsilane branching agent to monomer charged to the reactor is desirably less than about 0.5, preferably less than 0.2, and more preferably less than 0.1.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, or a combination thereof may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, for example, extraction utilizing hot, high boiling chlorinated solvents, acids or bases such as caustic followed by filtration.

A support may be optionally present in the catalyst formulation especially in a gas phase or slurry polymerization. Suitable supports include any inert, particulate material, but most suitably is a metal oxide, preferably alumina, silica, or an aluminosilicate material. Suitable particle sizes are from 1 to 1000 µm, preferably from 10 to 100 µm. Most desired supports are calcined silica, which may be treated to reduce surface hydroxyl groups by reaction with a silane, or similar reactive compound. Any suitable means for including such support in the catalyst formulation may be used, such as by dispersing the components in a liquid and contacting the same with the support and thereafter drying, by spraying, or coating the support with such liquid and thereafter removing the liquid, or by coprecipitating the cocatalyst and a support material from a liquid medium.

The polymerization is desirably carried out as a continuous polymerization, in which catalyst components, monomer(s), chain branching agent, and optionally solvent and diene are continuously supplied to the reaction zone and polymer product continuously removed therefrom. Within the scope of the terms "continuous" and "continuously" as used in this context are those processes in which there are intermittent additions of reactants and removal of products at small regular intervals, so that, over time, the overall process is continuous.

In one embodiment of operation, the polymerization is conducted in a continuous solution polymerization system comprising two reactors connected in series or parallel. In one reactor a relatively high molecular weight product (Mw from 300,000 to 600,000, more preferably 400,000 to 500,000) is formed while in the second reactor a product of a relatively low molecular weight (Mw 50,000 to 300,000) is formed. The final product is a blend of the two reactor effluents which are combined prior to devolatilization to result in a uniform blend of the two polymer products. Such a dual reactor process allows for the preparation of products having improved properties. In a preferred embodiment the reactors are connected in series, that is effluent from the first reactor is charged to the second reactor and fresh monomer, solvent and hydrogen is added to the second reactor. Reactor conditions are adjusted such that the weight ratio of polymer produced in the first reactor to that produced in the second reactor is from 20:80 to 80:20. In addition the temperature of the second reactor is controlled to produce the lower molecular weight product. This system beneficially allow for production of EPDM products having a large range of Mooney viscosities, as well as excellent strength and processability. Preferably the Mooney viscosity (ASTM D1646-94, ML1+4@125° C.) of the resulting product is adjusted to fall in the range from 1 to 200, preferably from 5 to 150 and most preferably from 10 to 110.

The polymerization process of the present invention can also be employed to advantage in a gas phase copolymerization process. Such processes are used commercially on a large scale for the manufacture of high density polyethylene (HDPE), medium density polyethylene (MDPE), linear low density polyethylene (LLDPE) and polypropylene. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having about 3 to about 8, preferably 4 to 6, carbon atoms. In the case that the monomer or comonomer itself is a volatile liquid, or can be condensed to provide such a liquid, this can suitably be fed to the bed to provide an evaporative cooling effect. Examples of olefin monomers which can be employed in this manner are olefins containing about three to about eight, preferably three to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032. For the teaching contained therein, the foregoing patents or publications, and their corresponding equivalent United States applications are hereby incorporated by reference.

The polymerization reaction occurring in the gas fluidized bed is catalyzed by the continuous or semi-continuous addition of catalyst. Such catalyst can be supported on an inorganic or organic support material as described above. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed copolymerization of the monomer and one or more comonomers on the fluidized particles of catalyst, supported catalyst or prepolymer within the bed. Start-up of the polymerization reaction is achieved using a bed of preformed polymer particles, which are preferably similar to the target polyolefin, and conditioning the bed by drying with inert gas or nitrogen prior to introducing the catalyst, the monomers and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. The process readily removes any residual silane or hydrocarbylsilane branching agent, as well as inert diluents and unreacted monomers which may be recycled to the reactor if desired.

Typically, the fluidized bed of the gas phase process is operated at temperatures greater than 50° C., preferably from about 60° C. to about 110° C., more preferably from about 70° C. to a bout 110° C.

A number of patents and patent applications describe gas phase processes which are adaptable for use in the process of this invention, particularly, U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; 5,616,661; and EP applications 659,773; 692,500; 780,404; 697,420; 628, 343; 593,083; 676,421; 683,176; 699,212; 699,213; 721, 798; 728;150; 728,151; 728,771; 728,772; 735,058; and PCT Applications WO-94/29032, WO-94/25497, WO-94/25495, WO-94/28032, WO-95/13305, WO-94/26793, WO-95/07942, WO-97/25355, WO-93/11171, WO-95/13305, and WO-95/13306, all of which, or their corresponding equivalent United States applications are hereby incorporated herein by reference.

For the preferred polyolefin polymer compositions of this invention, which may be produced by the polymerization processes of this invention using the catalyst systems of this invention, the long chain branch is longer than the short chain branch that results from the incorporation of one or more α-olefin comonomers or alkenylsilanes into the polymer backbone. The empirical effect of the presence of long chain branching in the polymers of this invention is manifested as enhanced rheological properties which are indicated by higher flow activation energies, greater $I_{21}/I_2$ than expected from the other structural properties of the compositions, enhanced melt rheological properties, and improved retention of physical properties upon repeated exposure to melting and shearing conditions. The polymers of the invention are especially adapted to use in recycling applications and beneficially improve physical properties of the resulting recycled polymers.

Further derivatives of interpolymers containing silane functionality incorporated via an addition polymerization process of an alkenylsilane, including those prepared according to the forgoing processes A), B) and C), are prepared by any suitable conversion process. Preferred conversion processes include hydrolysis or alcoholysis under basic or acidic conditions, or oxidation of ≡Si—H bonds to produce ≡Si—OR$^4$ groups; or aminolysis of ≡Si—H to produce ≡Si—NR$^4{}_2$, wherein R$^4$ is H or C$_{1-10}$ hydrocarbyl. Also included are processes wherein incomplete or partial hydrolysis, alcoholysis, aminolysis or oxidation of such bonds is conducted. Optionally, all of the forgoing procedures may be followed by one or more condensation-, coupling-, ionic coupling-, or ionic coupling with neutralization-reactions. Alternatively, a suitable conversion process includes direct reaction of the silane proton with a reactive compound or substituent such as a base.

Such conversion processes utilize conventional chemical reagents and processing conditions and are preferably conducted under solution or melt phase conditions. As an example, the hydrolysis of silane functionality may be readily accomplished by reaction with water or an alcohol, or glycol, optionally under conditions to subsequently remove by-products of the reaction, if desired. If only a portion of silane groups are hydrolyzed, coupling of the remaining silane groups by means of a condensation may be employed to give polymers with various degree of interchain coupling. The resulting materials possess greater sensitivity to shear and higher melt strength. Higher levels of silane content can produce products approaching those of fully cross-linked or vulcanized materials. Coupled products possessing unique combinations of properties can be obtained by coupling of interpolymers containing dissimilar silane functionality. Such coupled interpolymer products possess unique properties that tend to be intermediate between those of the individual interpolymers or chemically similar non-silane containing polymers, and may be used as compatibilizers in forming blends of two or more different silane containing interpolymers, blends of similar or dissimilar, non-silane, containing polymers, or blends of both types of polymers. The forgoing coupled polymers and blends thereof may be usefully employed to form articles such as sheets, films and fibers for use in sealing or wrapping applications, gaskets, filters and fabrics, that have improved solvent resistance, creep resistance, or other physical properties.

Oxidation of the silane group may involve reaction with oxygen, ozone, peroxide or other suitable oxidant. The oxidation reaction can be accelerated using a radical initiator such as peroxides or azobisiosbutyronitrile. The resulting $\equiv$Si—OH groups can be condensed, or otherwise used in the further reactions described herein.

Condensation of either hydrolyzed or oxidized silane functionality, or the $\equiv$SiH groups with hydroxyl functionality of other reagents may be employed to form additional conversion products. In particular, condensation with surface hydroxyl or other reactive groups of solid, especially particulated or fibrous materials, can result in improved compatability between components of composite materials prepared therefrom. Thus, blends or composites containing fillers or reinforcing aids comprising glass, silica, mica, natural or artificial fibers, clays, zeolites, talc, titanocenes, titanium dioxide, carbon, and other materials, having the surface hydroxyl moieties thereof condensed with the forgoing silane containing interpolymers, possess improved adhesion properties, enhanced coupling between fillers and/or tensile enhancing agents and the polymer, and provide articles and objects having enhanced paint, ink and dye acceptane.

Hydrolysis or partial hydrolysis and neutralization under basic conditions gives converted interpolymer products having $\equiv$Si—OR$^6$ groups, wherein R$^6$ is a metal cation, especially a monovalent or divalent metal cation, such as Na$^+$, Zn$^{2+}$ or Ca$^{2+}$. For polyvalent cations, charge balance may be maintained by use of discrete anionic ligand groups or sharing of the cation among multiple silicon containing groups. Such ionomeric, interpolymers possess many of the desirable properties of coupled interpolymers, yet remain more easily melt processable. Moreover, such converted interpolymers possess improved toughness, compared to the unconverted interpolymers. The property benefits are especially pronounced if the interpolymer contains on average, more than one silane group per polymer chain.

Such ionomeric interpolymers having a crystallinity of less than 20 percent are especially useful as thermoplastic elastomers. The $\equiv$Si—OR$^6$ groups, whether present in an amount that on average is less than or greater than one per chain, also confer benefits for melt processing, giving polymers having higher shear rate sensitivity and enhanced melt strength (rheology modified polymers) or having enhanced sub-melt processing such as improved sag resistance for thermoforming. Under appropriate conditions, such ionomeric interpolymers having the foregoing $\equiv$Si—OR$^6$ groups can be further condensed to produce further beneficial polymer types.

Condensation or other reaction of the silane functionalized interpolymers with a poly functional linker compound containing two or more groups independently selected from alcohol, amine, epoxy, peroxide, carboxylic acid, phosphoric acid, boric acid, metal salt derivatives of carboxylic acids, phosphoric acid or boric acid, isocyanate, nitrile, amide, ketone, ester, diazonium (or other carbene forming reagent), alkene, alkyne, and alpha-omega diene groups are also desirably performed. The linker compounds can be large or small and preferably contain from 2 to 100,000 atoms not counting hydrogen. Depending on the number of $\equiv$SiH groups per chain and the kind of polyfunctional linker employed, rheology modified polymers, surface modified polymers, crosslinked polymers, and grafted polymers can be obtained. Catalysts such as acids, bases, and transition metals can be used to accelerate the condensation or other reaction.

By way of further explication, the reaction of a polymer sample averaging less than 1 $\equiv$SiH per chain can react with diethylene glycol, glycerine, or a diamine to result in the formation of a rheology modified polymers or surface modified polymers. The same reaction with a polymer having more on average than one SiH functionality per chain may be used to form polymers having varying degrees of coupling up to and including cross-linked, thermosetting polymers. The reaction of a high crystalline polyolefin polymer containing such $\equiv$SiH functionality with a polyethyleneglycol or a polyethyleneglycol amine results in the formation of a grafted polymer containing hard polyolefin segments linked by soft polyethyleneether or polyethylene-amine segments. Conversely, the reaction of an elastomeric interpolymer containing $\equiv$SiH groups, or the hydrolyzed derivatives thereof, results in formation of polymers that are extremely effective impact modifiers for polar group containing engineering thermoplastics such as polyesters, polyamides and polyimides. The $\equiv$SiH groups can react with functionality present in such engineering thermoplastics (e.g., amine, hydroxyl, and other functionality) to chemically bond the elastomeric interpolymer to the engineering thermoplastic. Such products are useful in compatibilizing blends of polyolefins with polar engineering thermoplastics.

In a final embodiment, the silane functionality of interpolymers according to the invention may be converted to groups which could serve as initiators for other polymerization processes. From these new materials, block copolymers and blends of polymers may also be prepared. For example, use of an unsymmetrical difunctional bisamine or a compound containing both and alcohol and an amine functionality to hydrolyze the silane functionality, could lead to initiation points for grafting polyurethane functionality onto the interpolymer. Similarly, hydrosilation with e.g., an epoxide such as 3,4-epoxy-1-butene results in the formation of initiating points for growing polyether polymers. Blends of these resulting polymers possess desirable physical properties.

Any additives that accelerate the above reactions, especially the hydrolysis or condensation reactions, can be used in this invention, if desired. Examples of known suitable classes of accelerating additives are organic or inorganic Lewis bases, organometallic compounds wherein the metal is a metal selected from groups 1–13 of the Periodic Table of the Elements containing up to 100 carbon atoms, inorganic ammonium salts or salts of metals of Groups 1 or 2 of the Periodic Table of the Elements, carboxylic acids and their ammonium or Group 1 or 2 metal salts, titanates, silicates, aluminosilicates, and magnesioaluminosilicates. Some specific examples of such accelerating additives would be calcium oxide, magnesium oxide, calcium hydroxide, magnesium hydroxide, aluminum hydroxide, calcium carbonate, magnesium carbonate, sodium carbonate, potassium carbonate, magnesium aluminum hydroxy carbonate hydrate, sodium bicarbonate, magnesium stearate, zinc stearate, calcium stearate, sodium stearate, titanium tetra(2-ethylhexyl)alkoxides, precipitated silicas, hydrotalcites, magadiites, laponites, hectorites, sodium silicates, sodium aluminosilicates, ammonium silicates, and ammonium aluminosilicates. Accelerating compounds that contain hydroxide groups or hydrated or physisorbed water are particularly useful in this invention. Because stronger bonds between the hydroxyl oxygen and the additive occur in hydrates, those are most preferred.

Having described the invention, the following examples are provided as further illustrative and are not to be construed as limiting. The skilled artisan will appreciate that the invention disclosed herein may be practiced in the absence of any component which has not been specifically disclosed. Unless stated to the contrary, all parts and percentages are based on weight.

EXAMPLE 1

Monomer and solvent were purified by passing through activated alumina and supported copper catalyst (Q5 reactant, available from Engelhardt Corporation, and otherwise handled using standard inert atmosphere techniques. Manipulations of catalyst and cocatalyst (both as 0.0050 M solutions in toluene) were carried out in an inert atmosphere glove box.

Solvent (Isopar E® available from Exxon Chemicals Inc.) and octene-1 were purified by sparging with purified nitrogen followed by passage through columns containing A2 alumina and Q5 reactant at 50 psig (350 kPa) using a purified nitrogen pad. Allyldimethylsilane was purified by sparging with nitrogen and passage through a column containing A2 alumina. All transfers of solvents and solutions described below were accomplished using a gaseous pad of dry, purified nitrogen or argon. Gaseous feeds to the reactor were purified by passage through columns of A-204 alumina and Q5 reactant. Alumina was previously activated at 375° C. with nitrogen and Q5 reactant was activated at 200° C. with 5 mole percent hydrogen in nitrogen.

The batch reactor polymerization was conducted in a two liter Parr reactor with an electrical heating jacket, internal serpentine coil for cooling, and a bottom drain valve. Pressures, temperatures and block valves were computer monitored and controlled. Solvent (about 876 g) and octene-1 (about 31 g) were measured in a solvent shot tank fitted with a weigh cell. Allyldimethylsilane was transferred to the solvent tank from the glove box. This solution was then added to the reactor from the solvent shot tank. The contents of the reactor were stirred at 1200 rpm. Hydrogen was added by differential expansion (Δ 10 psi, 70 kPa) from a 75 ml shot tank initially at 300 psig (2 Mpa). The reactor was heated to the desired run temperature, 140° C., under 450 psig (3.5 MPa) of ethylene pressure. The catalyst ((t-butylamido)dimethyl($\eta^5$-tetramethylcyclopentadienyl) silanetitani um(II) 1,3-pentadiene, 1.7 μmoles) and tris (pentafluorophenyl)borane cocatalyst (5.1 μmoles) were combined in the glove box and transferred to the catalyst shot tank through 1/16 in (0.16 cm) tubing using toluene to aid in the transfer. The catalyst tank was then pressurized to 700 psig (4.8 MPa) using nitrogen. After the contents of the reactor had stabilized at the desired run temperature of 140° C., the catalyst was injected into the reactor via a dip tube. The temperature was maintained by allowing cold ethylene glycol solution to pass through the internal cooling coils. The reaction was allowed to proceed for 15 minutes with ethylene provided on demand. The contents of the reactor were then expelled into a 4 L, nitrogen purged vessel and quenched with isopropyl alcohol. Volatile materials were removed from the polymers in a vacuum oven up to 140° C. overnight and cooled to at least 50° C. prior to removal from the oven. The polymer yield was 103 g. Polymer density was 0.916 g/mL and I2 was 4.2.

A sample of the polymer was melt blended at 140° C. for 5 minutes. Another sample was combined with hydrated calcium stearate (CaSt, 0.2 wt percent) and melt blended at 140° C. for 5 minutes. A further portion of this sample was then reblended at 200° C. for an additional 5 minutes. It is believed, the presence of silane branching in the polymer is indicated by increase in $V_{0.1}/V_{100}$ after repeated melt blending in this manner. Results are contained in Table 1.

TABLE 1

| Sample | Post Treatment | $V_{0.1}$* | $V_{100}$** | $V_{0.1}/V_{100}$ |
|---|---|---|---|---|
| A | none | 0.3 | 0.1 | 4 |
| B | A blended 5 minutes at 140° C. | 0.7 | 0.1 | 7 |

TABLE 1-continued

| Sample | Post Treatment | $V_{0.1}$* | $V_{100}$** | $V_{0.1}/V_{100}$ |
|---|---|---|---|---|
| C | A + CaSt blended 5 minutes at 140° C. | 1.5 | 0.1 | 15 |
| D | C blended 5 minutes at 200° C. | 40 | 0.2 | 200 |

*viscosity at 0.1 radians/sec ($\times 10^{-5}$)
**viscosity at 100 radian/sec ($\times 10^{-5}$)

EXAMPLE 2

Copolymers of propylene and allyldimethylsilane (ADMS), as well as polypropylene homopolymer controls were prepared by a by a slurry polymerization and a solution polymerization process substantially according to Example 1.

Slurry Polymerization Conditions (A0–A4)

A 1.8 liter Mettler reactor was charged with 500 g propylene, and allyldimethylsilane via a comonomer transfer line which was subsequently washed three times with 5ml toluene. Hydrogen was added as a molecular weight control agent by differential pressure expansion from a 50 ml addition tank at 40 psi (2153 kPa). The reactor was heated to the prepolymerization temperature of 25° C. Supported catalyst (dried and triethylaluminum treated silica containing dimethylsilanebis(2-methyl-4-phenylinden-1-yl) zirconium (II) 1,4-diphenyl-1,3-butadiene catalyst and methyldi(octadecyl)ammonium diethylaluminumoxyphenyltris(pentafluorophenyl)borate cocatalyst (approximate molar ratio 1:1) was slurried with 20 mL hexane in the glove box, taken to the reactor cubicle and injected into the catalyst addition tank and shot into the reactor.

The supported catalyst was prepared in the following maner. Silica (3.00 g, SMR 49-2814, available from Grace Davison company, dried and pretreated with a stoichiometric quantity of triethylaluminum (TEA) to remove hydroxyl groups, was added to a 4 oz bottle. 3.3 mL Of a toluene solution of methyldi(octadecyl)ammonium diethylaluminumoxyphenyltris(pentafluoro-phenyl)borate in toluene (total solvent=1.1 ml/g silica, 180 μmole of boron) was added and the mixture was shaken by hand until clumping was gone (about 2 minutes) then placed on a mechanical shaker for 10 more minutes. Mixed hexanes (24 mL) were added and the bottle was shaken for about 15 minutes. Dimethylsilanebis(2-methyl-4-phenylinden-1-yl) zirconium 1,4-diphenyl-1,3-butadiene catalyst (0.1132 g total Zr) in 7 mL toluene was then added. Approximately 20 mL of mixed hexanes were added and the resulting slurry was shaken for about 3 h. The resulting bluish product was filtered on a medium frit, washed 2x with 30 ml of hexanes and dried under vacuum overnight.

Details of the method of handling and conveying the supported catalyst are as follows. The supported catalyst was weighed into a 20 mL glass vial inside the glove box. Hexane (20 mL) was added to the vial and the vial placed in a clamp. A wide-bore, flat end, needle was fitted onto a 20 mL disposable syringe and the supported catalyst-hexane mixture was briskly stirred with the needle. The slurry was quickly drawn into the syringe and the short, blunt needle replaced with a 12 inch (25 cm) needle. A gas chromatograph (GC) septum was placed on each end of a small transfer vessel made by fusing together two GC vials and the needle was pushed through one of the septa.

With the catalyst shot tank vented and under low pressure nitrogen purge from a cylinder supply and argon purge from the glove box, 20 mL of n-hexanes were sent to the catalyst shot tank from the glove box and the argon flow was maintained. The syringe containing 20 mL of slurry was taken out of the glove box and into the reactor cubicle. A manual valve at the top of the catalyst shot tank was opened and the slurry injected into the catalyst shot tank. The 1/16 inch (1.6 mm) stainless steel (ss) line through which the argon flows into the shot tank extends to approximately an inch off the bottom of the 0.050 L ss shot tank preventing the slurry particles from settling out of suspension. The argon flow was stopped, the shot tank was filled with nitrogen and the slurry was pressured into the reactor.

After 10 minutes reaction, the reactor temperature was increased to 60° C. and maintained at that temperature for the indicated polymerization time. The resulting polymer solution was removed from the reactor and dried in a vacuum oven under gradually increasing temperature and gradually decreasing pressure. The polymer was held at a final temperature of 140° C. and a final pressure of 100 torr (13 kPa) for about 15 hours. No antioxidant was used.

Solution Polymerization conditions (B0–B4)

A 1.8 liter Mettler reactor was charged with 600 g Isopar-E™ mixed alkanes solvent (available from Exxon Chemicals Inc.), 150 g propylene, and allyldimethylsilane via a comonomer transfer line which was subsequently washed three times with 5 ml toluene. Hydrogen was added as a molecular weight control agent by differential pressure expansion from a 50 ml addition tank at 25 psi (2153 kPa). The reactor was heated to the polymerization temperature of 90° C. The same solvent was used to prepare solutions of dimethylsilanebis(2-methyl-4-phenylinden-1-yl)zirconium (II) 1,4-diphenyl-1,3-butadiene catalyst and methyldi (octadecyl)ammonium 1,3-bis(tris(pentafluorophenyl) alumane)-2-undecylimidazolide cocatalyst (prepared according to the teachings of U.S. Ser. No. 09/251,664 filed Feb. 17, 1999, WO 99/42467, published August, 26, 1999 which were premixed in a drybox for approximately one minute in an approximate molar ratio of 1:1, then transferred to a catalyst addition tank and injected into the reactor. After the indicated polymerization time, the resulting polymer solution was removed from the reactor and dried in a vacuum oven under gradually increasing temperature and gradually decreasing pressure. The polymer was held at a final temperature of 140° C. and a final pressure of 100 torr (13 kPa) for about 15 hours. No anti-oxidant was added to the polymer.

The level of ADMS incorporated into the polymers was estimated by the following procedure. Infrared spectra were obtained from compression molded films with thicknesses in the range of 0.25–0.50 mm. The peak absorbance at about 2130 cm$^{-1}$, which is assigned to $R_3Si$—H, was then used to calculate the ADMS levels in the polymers, using Beer's law with an extinction coefficient of 2.56 (mm * mole percent)$^{-1}$. Molecular weights were measured by size exclusion chromatography. The chromatography columns were calibrated with polystyrene standards, and the universal calibration relationship together with the Mark-Houwink coefficients for polystyrene and polypropylene were then used to calculate molecular weights on a polypropylene basis. Results are contained in Table 2.

TABLE 2

| Code | Run time (min) | μmoles catalyst | mL ADMS in feed | Yield (g) | [ADMS] in polymer mole percent | Mw (kg/mol) |
|---|---|---|---|---|---|---|
| A0 (control) | 10 | 2.50 | 0 | 28 | 0 | 232 |
| A1 | 6.8 | 2.00 | 0.5 | 70 | 0.133 | 163 |
| A2 | 8.3 | 2.50 | 1.0 | 56 | 0.144 | 205 |
| A3 | 7.6 | 2.37 | 2.0 | 52 | 0.165 | 183 |
| A4 | 6.7 | 2.37 | 4.0 | 54 | 0.245 | 209 |
| B0 (control) | 60 | 1.7 | 0 | 176 | 0 | 103 |
| B1 | 45 | 1.7 | 0.5 | 176 | 0.30 | 85 |
| B2 | 45 | 1.7 | 1.0 | 125 | 0.38 | 101 |
| B3 | 45 | 1.7 | 2.0 | 108 | 0.76 | 90 |
| B4 | 45 | 1.7 | 4.0 | 176 | 1.56 | 78 |

The above polymers were subjected to various melt treatments using a Haake Rheocord 90 torque rheometer with a Haake Rheomix Type 600 internal mixer head with sigma-type blades and internal volume of about 25 cm$^3$ (Fisons Instruments, Valencia, Calif.). With this size mixing head, the weight of polymer required to fill the mixing head at melt temperature is about 18–20 grams. The melt treatment procedure consisted of the following steps. First, the mixer head was heated to a temperature of 190° C. and the rotor speed was set to 75 rpm. Next, about half of the total charge of polymer was added to the instrument and allowed to melt. Third, 5000 ppm by weight of a stabilizer/antioxidant package that is a 1:1 mixture by weight of tris(2,4-di-(tert)-butylphenyl) phosphite and tetrakis [methylene(3,5-di-(tert)-butyl-4-hydroxyhydrocinnamate)] methane (Irganox™ B225, available from Ciba Specialty Chemicals Corporation) was added. Fourth, after allowing 30–60 sec for the stabilizer/antioxidant package to mix with the polymer, 2000 ppm by weight of an additive chosen either to facilitate or accelerate or participate in further chemical reactions of the inventive polymers was added to some of the polymer samples. Fifth, the remainder of the polymer charge was added. Sixth, the rotor speed was increased to 150 rpm and mixing was continued for an additional twenty minutes. At the completion of each run, the mixer head was opened to remove the polymer for subsequent analyses.

Molecular weights of the melt treated polymers were measured by size exclusion chromatography as described above. The complex dynamic shear viscosity (Vsh) of melt treated polymers and corresponding controls as a function of angular frequency (rate) was measured at 200° C. and a rate of 0.1 radians per second using a Rheometrics Model RDS-IIE dynamic mechanical spectrometer equipped with a force rebalance transducer, environmental chamber, and parallel plate test fixtures (Rheometrics, Inc., Piscataway, N.J.). The measurements were made on compression molded samples according to the technique described in, J. D. Ferry, *Viscoelastic Properties of Polymers*, 3rd Edition, John Wiley and Sons, New York, 1980. Results are contained in Table 3, wherein comparative, non-inventive samples are denoted by the prefix "C".

TABLE 3

| sample | Melt treated? | Polymer | Additive* | Mw (kg/mol) | Vsh (Poise) |
|---|---|---|---|---|---|
| C1 | no | A0 | none | 232 | 9297 |
| C2 | yes | A0 | none | 198 | 6872 |
| C3 | yes | A0 | calcium stearate | 203 | 8372 |
| C4 | yes | A0 | ammonium silicate (amorphous) | 193 | 7117 |
| C5 | yes | A0 | Mg$_4$.5Al$_2$(OH)$_{13}$CO$_3$.3.5H$_2$O | 176 | 5266 |
| C6 | no | A3 | none | 183 | 4115 |
| 1 | yes | A3 | magnesium oxide | 182 | 5308 |
| 2 | yes | A3 | synthetic hectorite | 186 | 6444 |
| 3 | yes | A3 | Mg$_4$.5Al$_2$(OH)$_{13}$CO$_3$.3.5H$_2$O | 190 | 5776 |
| 4 | yes | A3 | calcium stearate | 162 | 3588 |
| C7 | no | A4 | none | 209 | 6339 |
| 5 | yes | A4 | none | 192 | 6541 |
| 6 | yes | A4 | sodium silicate (amorphous) | 196 | 7402 |
| 7 | yes | A4 | ammonium silicate (amorphous) | —** | 6369 |
| C8 | no | B1 | none | 85 | 282 |
| 8 | yes | B1 | ammonium silicate (amorphous) | 82 | 571 |
| C9 | no | B2 | none | 101 | 550 |
| 9 | yes | B2 | sodium silicate (amorphous) | 101 | 869 |
| C10 | no | B3 | none | 90 | 390 |
| 10 | yes | B3 | calcium stearate | 91 | 805 |

*All additives had some physically adsorbed water.
**not determined

Comparative samples C2–C5 illustrate the effects of melt treatment on polymers that contain no ≡Si—H groups. In comparison to the untreated polymer (C1), melt treatment results in decreased molecular weight and decreased melt viscosity. This is believed to be the result of thermo-oxidative chain scission, which is ameliorated but not eliminated by addition of a stabilizer/antioxidant package during melt treatment.

Samples 1–10 illustrate the effects of melt treatment on the ≡Si—H containing copolymers of this invention. By comparison of Samples 1–4 with C6; Samples 5–7 with C7; Sample 8 with C8; Sample 9 with C9; Sample 10 with C10; and all inventive samples with the comparatives C2–C5, it may be seen that the present polymers show relatively little change in molecular weight upon melt treatment. In addition, the inventive polymers (with the exception of sample 4) show a relative increase in melt viscosity after melt treatment compared to the controls.

The relatively constant molecular weight and increased viscosity of samples 1–3 and 5–10 upon melt treatment are especially significant if considered in light of a "truer" baseline than the treated polymers, namely, the baseline that is provided by the melt treatment results for C2–C5. That is, the molecular weights and viscosities for samples 1–3 and 5–10 should be considered relative to the lower values that are seen for melt treated polymers that do not contain ≡Si—H groups. These results demonstrate that the polymers of the invention provide increased viscosity and correspondingly increased melt strength compared to unmodified polymers. Increased melt strength beneficially allows the manufacture of film and foam products from polymers that normally lack sufficient melt strength properties for such manufacturing techniques. The increase in viscosity at essentially constant molecular weight for the melt treated silane functional copolymers of the above examples is indicative of formation of branched or effectively branched polymers by one or more types of chemical transformations.

Upon melt treatment it is further observed that the polymers of this invention retain their melt rheological properties for a longer time. The silane functional copolymers of the invention accordingly possess improved molecular weight, viscosity, and melt strength retention after initial and repeated melt processing. This improved retention of molecular weight and melt rheological properties is beneficial for melt fabrication processes. This improvement is particularly beneficial for homopolymers or copolymers of higher α-olefins, such as polypropylene, which typically tend to show reductions in molecular weight, viscosity, and melt strength upon melt processing. For example, this benefit allows for higher levels of incorporation of recycled or reground polymer into a product without adverse effects on fabrication behavior.

This improved retention of molecular weight and viscosity is observed for melt treated silane functional copolymers even without the use of an additive designed to facilitate or accelerate or participate in further chemical reactions, as illustrated by the following examples. A control homopolymer and several silane functional copolymers were compression molded into disks, then the change in complex dynamic shear viscosity, Vsh at a rate of 1 radian/sec and temperature of 200° C., was measured as a function of time using a Rheometrics Model RDS-IIE dynamic mechanical spectrometer with parallel plate fixtures. Because of different molecular weights and viscosities of the starting resins, for meaningful intercomparison it is useful to calculate the relative viscosity ratio R, defined as the ratio of Vsh at time t to Vsh at the start of the test, R=Vsh(t)Nsh(0). For the examples below, R is observed to decrease approximately linearly with time, starting from an initial value of R=1 for all resins. The magnitudes of the slopes S (S=ΔR/Δt) of these lines, fit to data for the first 1000 seconds of the test, indicate the rates at which Vsh, appropriately normalized to account for differences in starting viscosity, decreases versus time. It is observed that the silane functional copolymers of the invention show a less rapid decrease in R than the control polymer (that is, they possess a smaller S corresponding to less steep slope), and further that the decrease in R is less rapid the higher the silane functionality of the copolymer. Results are contained in Table 4.

TABLE 4

| Sample | Polymer | $-1 \times 10^5 \times S$ (l/sec) |
|---|---|---|
| C11 | A0 | 7.2 |
| 11 | A1 | 5.5 |
| 12 | A2 | 6.0 |
| 13 | A3 | 4.3 |
| 14 | A4 | 3.5 |

What is claimed is:

1. A derivative of a silane functionalized interpolymer prepared according to a process comprising contacting one or more addition polymerizable monomers lacking silane functionality and one or more alkenylsilane compounds corresponding to the formula: $A_n J_j SiH_{4-(n+j)}$ wherein:

J is $C_{1-40}$ hydrocarbyl,

A is a $C_{2-20}$ alkenyl group, n is 1 or 2, and j is 0, 1 or 2; with a catalyst composition comprising a Group 4 metal complex comprising from 1 to 3 π-bonded anionic or neutral ligand groups, under addition polymerization conditions, wherein the interpolymer comprises from 0.01 to 100 long chain branches per 10,000 carbons, said derivative being formed by one or more subsequent silane conversion processes selected from the group consisting of:
  a) coupling of one or more chains of such interpolymers,
  b) hydrolysis, alcoholysis, oxidation, or aminolysis to give Si—$OR^4$ or Si—$NR^4_2$ groups, where $R^4$ is H or $C_{1-10}$ hydrocarbyl;
  c) hydrolysis and neutralization to give ionomers having Si—$OR^6$ groups, where $R^6$ is a metal cation; and
  d) condensation with an inorganic substrate having surface hydroxyl groups or a polyfunctional linker compound containing two or more alcohol, amine, epoxy, peroxide, carboxy, isocyanate, nitrile, amide, ketone, ester, or diazonium groups or metal salt derivatives of carboxy groups.

2. A derivative according to claim 1 wherein j is 2.

3. A derivative according to claim 1 wherein the interpolymer comprises randomly distributed silane functionality.

4. A hydrolyzed derivative according to claim 1 wherein $R^4$ is hydrogen, prepared by a process wherein an additive containing hydroxyl groups, a hydrated compound or a compound containing physically absorbed water is reacted with the silane functionalized interpolymer.

* * * * *